United States Patent
Natrayan et al.

(10) Patent No.: US 11,216,379 B2
(45) Date of Patent: Jan. 4, 2022

(54) FAST CACHE LOADING WITH ZERO FILL

(71) Applicant: Analog Devices International Unlimited Company, Limerick (IE)

(72) Inventors: Thirukumaran Natrayan, Bangalore (IN); Saurbh Srivastava, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/942,464

(22) Filed: Jul. 29, 2020

(65) Prior Publication Data
US 2021/0034530 A1 Feb. 4, 2021

(30) Foreign Application Priority Data
Jul. 30, 2019 (IN) .............................. 201941030691

(51) Int. Cl.
*G06F 12/08* (2016.01)
*G06F 12/0862* (2016.01)

(52) U.S. Cl.
CPC .. *G06F 12/0862* (2013.01); *G06F 2212/1024* (2013.01); *G06F 2212/602* (2013.01)

(58) Field of Classification Search
CPC ......... G06F 12/0862; G06F 2212/1024; G06F 2212/602
See application file for complete search history.

(56) References Cited

U.S. PATENT DOCUMENTS

| | | | |
|---|---|---|---|
| 2011/0107031 A1 | 5/2011 | Anand et al. | |
| 2011/0202726 A1* | 8/2011 | Laycock | G06F 12/0815 711/122 |
| 2016/0034399 A1* | 2/2016 | Giri | G06F 12/0848 711/125 |
| 2017/0177482 A1* | 6/2017 | Greenspan | G06F 9/4406 |

FOREIGN PATENT DOCUMENTS

WO 2016043271 A1 3/2016

* cited by examiner

*Primary Examiner* — Tracy C Chan
(74) *Attorney, Agent, or Firm* — Patent Capital Group

(57) ABSTRACT

A processor system includes a processor core, a cache, a cache controller, and a cache assist controller. The processor core issues a read/write command for reading data from or writing data to a memory. The processor core also outputs an address range specifying addresses for which the cache assist controller can return zero fill, e.g., an address range for the read/write command. The cache controller transmits a cache request to the cache assist controller based on the read/write command. The cache assist controller receives the address range output by the processor core and compares the address range to the cache request. If a memory address in the cache request falls within the address range, the cache assist controller returns a string of zeroes, rather than fetching and returning data stored at the memory address.

20 Claims, 6 Drawing Sheets

FAST CACHE LOADING WITH ZERO FILL

CROSS-REFERENCE TO RELATED APPLICATIONS

This application claims the benefit of and priority from IN Provisional Patent Application Serial No. 201941030691 filed Jul. 30, 2019, entitled, FAST CACHE LOADING WITH 'ZERO FILL' FOR READ-AFTER-WRITE BUFFERS", incorporated herein by reference in its entirety.

TECHNICAL FIELD OF THE DISCLOSURE

The present invention relates to the field of cache control, and in particular to techniques for extended cache controllers to return zero fill.

BACKGROUND

Cache-based memory subsystems improve processor performance by storing data likely to be requested by the processor in a cache located near the processor core. If the processor requests data that is stored in the cache, the cache can quickly retrieve and return the cache data. When the processor core requests data that is not stored in the cache, this results in a "cache miss." During a cache miss, a significant number of processor cycles are spent fetching data from a lower-level memory, which lowers the effective speed and performance of the processor.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
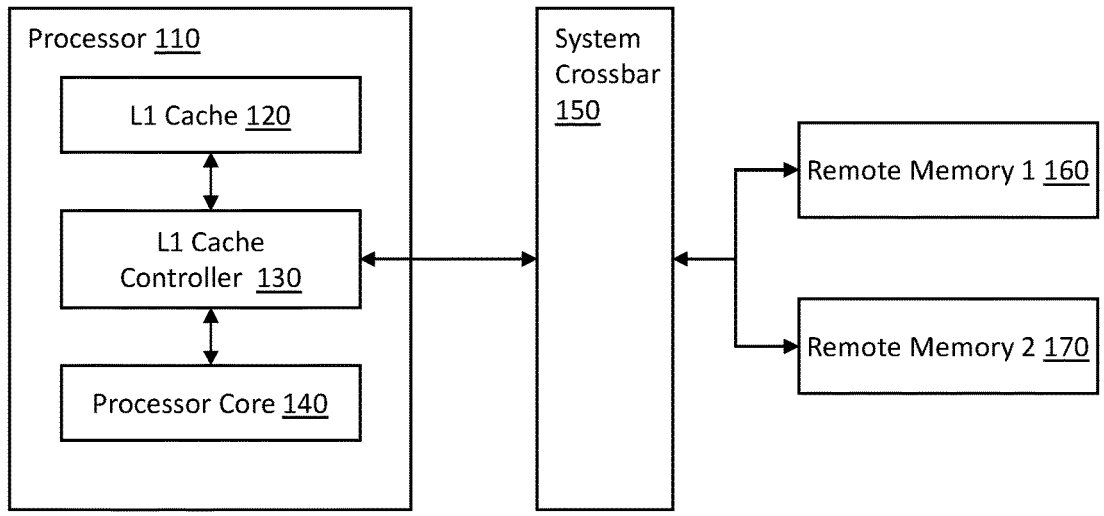
FIG. 1 is a block diagram of prior art processing system, according to some embodiments of the present disclosure.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

A cache assist controller that provides zero fill in response to certain types of cache misses is described herein. The cache assist controller assists a processor that includes a processor core, a cache, and a cache controller. The cache stores copies of data stored at a lower level memory, such as copies of data stored in frequently-accessed memory locations, or copies of data stored in memory locations that the processor may soon request. The cache controller interfaces between the cache and the processor core. The cache controller pre-fetches data from the lower level memory that the processor core is likely to request, and the cache controller loads the pre-fetched data in the cache. In addition, the cache controller fetches data from a lower level memory in the event of a cache miss.

The cache assist controller interfaces between the cache controller and the lower level memory and assists the cache controller in fetching data from the lower level memory. In certain cache misses, the cache controller requests that the cache assist controller return data that the processor core then overwrites. For example, if the processor plans to write to a particular memory address, and the cache does not store the data at this memory address, the cache controller requests that the cache assist controller fetch or provide this data. However, since the data is to be overwritten, fetching the data is unnecessary and reduces processor efficiency and performance. In such cache misses, the cache assist controller described herein returns zero fill (i.e., a string of zeroes, or other dummy data) rather than fetching the data. The cache assist controller is able to return the zero fill immediately, rather than taking time to fetch the data from the lower level memory. Returning zero fill in such situations improves performance of the processor system.

The processor core indicates to the cache assist controller ranges of memory addresses for which zero fill can be returned, e.g., memory addresses for which the processor core intends to overwrite any existing data. When the cache assist controller receives a request from the cache controller for data at a particular address, the cache assist controller compares the address to a zero fill address range provided by the processor core. If the address requested by the cache controller falls within the zero fill address range, the cache assist controller returns zero fill to the cache controller. Otherwise, the cache assist controller returns the data at the requested address, either from a buffer in the cache assist controller, or by fetching the data from a lower level memory.

Embodiments of the present disclosure provide a processor system that includes a processor core and a cache assist controller. The processor core is configured to issue a read/write command for reading data from or writing data to a memory, and, in response to issuing the read/write command, output an address range corresponding to the read/write command. The cache assist controller is configured to receive the address range output by the processor core; receive a cache request from a cache controller, the cache request including a memory address; compare the memory address to the address range; and, in response to the memory address falling within the address range, returning a string of zeroes to the cache controller in response to the cache request.

Further embodiments of the present disclosure provide a cache assist controller that includes a first input configured to receive an address range, the address range provided by a processor core issuing a read/write command; a second input configured to receive, from a cache controller, a request for data stored at a memory address; and processing circuitry configured to compare the memory address to the address range, return a string of zeroes to the cache controller in response to the memory address falling within the address range, and return data stored at the memory address in response to the memory address falling outside the address range.

Further embodiments of the present disclosure provide a method that includes receiving, from a processor core conducting a read/write operation, an address range; receiving, from a cache controller, a request for data stored at a memory address of the memory; comparing the memory address to the address range; in response to the memory address falling within the address range, returning a string of zeroes to the cache controller; and in response to the memory address falling outside the address range, returning data stored at the memory address.

As will be appreciated by one skilled in the art, aspects of the present disclosure, in particular aspects of fast cache loading with zero fill, and processor systems and cache assist controllers that provide zero fill, described herein, may be embodied in various manners (e.g., as a method, a system, a computer program product, or a computer-readable storage medium). Accordingly, aspects of the present disclosure may take the form of a hardware embodiment, a software embodiment (including firmware, resident software, microcode, etc.), or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example Prior Art Processing System

FIG. 1 is a block diagram of prior art processing system that includes a processor 110 and several remote memories 160 and 170. The processor 110 includes a level 1 (L1) cache 120, an L1 cache controller 130, and a processor core 140. The processor 110 may be an embedded processor, system-on-chip (SoC) processor, central processing unit (CPU), graphics processing unit (GPU), audio processor, digital signal processor (DSP), or another type of processor or processing element. The processor core 140 executes instructions to conduct operations, including reading instructions and data from one or more memory systems, and writing data to the memory system(s). In the example shown in FIG. 1, the processor 110 interfaces with remote memory 1 160 and remote memory 2 170 via a system crossbar 150. Fewer or more remote memories may be included. The remote memories 160 and 170 may include lower-level caches (e.g., L2 and L3 caches), main memory (e.g., dynamic random-access memory (DRAM) or another type of RAM), or other types of memories. Each of the remote memories 160 and 170 may be on the same chip or die as the processor 110, or on one or more separate chips or dies. The system crossbar 150 sits between the processor 110 and remote memories 160 and 170 and enables the processor 110 to access the remote memories 160 and 170.

The L1 cache 120 is a cache memory that stores data that is likely to be requested by the processor 110. The L1 cache 120 stores a copy of a portion of the data stored on one or more other lower-level memories, e.g., remote memories 160 and 170, that may be requested by the processor core 140. Retrieving data from the L1 cache 120 is faster than retrieving data from a remote memory 160 or 170, so using the L1 cache 120 to store a portion of the data from the remote memories 160 and 170 improves the speed of the processing system.

The L1 cache controller 130 sits between the L1 cache 120 and the processor core 140. The L1 cache controller 130 receives data requests (i.e., read and write requests) from the processor core 140. The data request may reference a particular memory location in a main memory (e.g., remote memory 2 170), and the L1 cache controller 130 determines if the L1 cache 120 stores a copy of the data at the memory location. If the L1 cache 120 stores the requested data, the L1 cache controller 130 retrieves the data from the L1 cache 120 and returns the data to the processor core 140. This is referred to as a "cache hit." In a "cache miss," the requested data is not stored in the L1 cache 120. When this occurs, the L1 cache controller 130 retrieves the data from a lower level memory, e.g., remote memory 1 160 or remote memory 2 170. For example, the L1 cache controller 130 proceeds to request the memory from increasingly lower level memories (e.g., an L2 cache, followed by an L3 cache, followed by DRAM) until the data is found.

The L1 cache controller 130 identifies data that the processor core 140 is likely to request based on the behavior of the processor core 140. For example, if the processor core 140 requests data at a given memory address (e.g., a particular instruction line), it is likely that the processor core 140 requests data at one or more subsequent memory addresses (e.g., the next three instruction lines) soon thereafter. Thus, the L1 cache controller 130 pre-fetches data at the subsequent memory addresses from a lower-level memory (e.g., remote memory 1 160 or remote memory 2 170) and stores the pre-fetched data in the L1 cache 120. This enables the L1 cache controller 130 to quickly return the pre-fetched data to the processor core 140 when it is requested.

If the processor core 140 accesses data that is not in sequence with a prior request, this may cause a cache miss if the data has not been pre-fetched. Many L1 caches are read/write agnostic, meaning that the L1 cache controller 130 retrieves and returns data associated with any memory access by the processor core 140, i.e., both read requests and write requests instructed by the processor core 140. In particular, in a write-cache-miss, the L1 cache controller 130 receives a write request to a particular memory location from the processor core 140, determines that the data corresponding to the memory location is not stored in the L1 cache 120, and fetches the data from a lower-level memory. The L1 cache controller 130 fetches the data only for the data to be written over by the write request.

Example Processing System with Cache Assist Controller for Zero Fill

Figure 2:
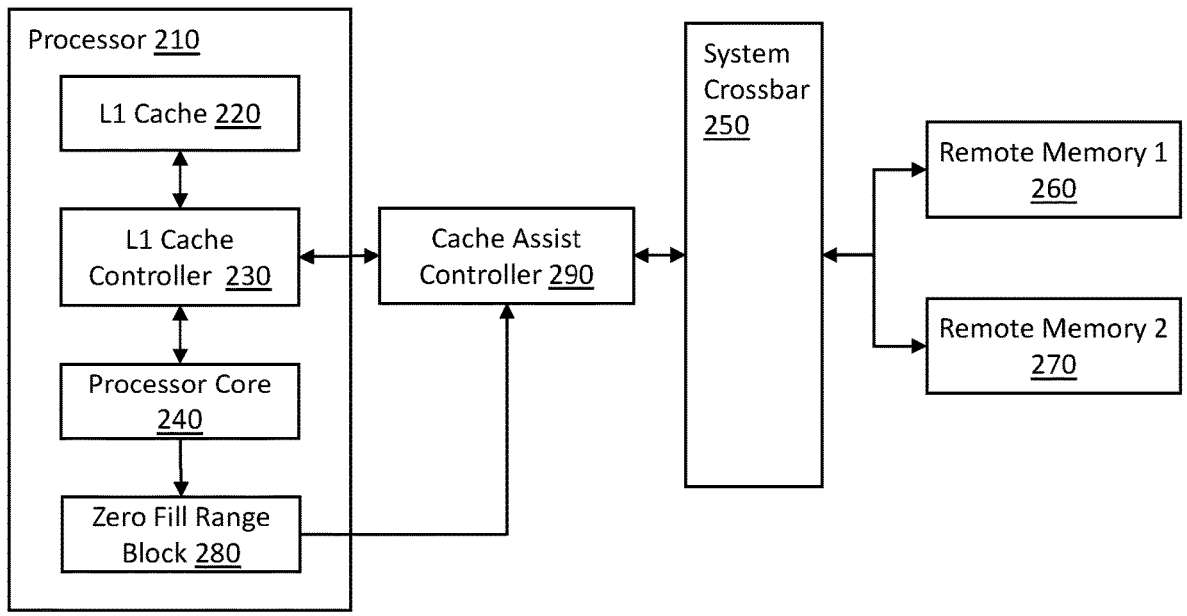
FIG. 2 is a block diagram of a processing system that includes a cache assist controller configured to return zero fill based on a zero fill range, according to some embodiments of the present disclosure.

FIG. 2 is a block diagram of a processing system that includes a cache assist controller configured to return zero fill based on a zero fill range. The processing system includes a processor 210, a cache assist controller 290, a system crossbar 250, and two remote memories 260 and 270. The processor 210 may be an embedded processor, SoC processor, CPU, GPU, audio processor, DSP, or another type of processor or processing element. The processor 210 includes an L1 cache 220 and an L1 cache controller 230, which are similar to the L1 cache 120 and L1 cache controller 130 described with respect to FIG. 1.

The processor 210 further includes a processor core 240. The processor core 240 executes instructions to conduct operations, including reading instructions and data from one or more memory systems, and writing data to the memory system(s). In addition, the processor 240 outputs a zero fill range block 280 that indicates one or more addresses for which zero fill can be provided. For example, if the processor core 240 executes an instruction that involves writing to a range of memory addresses without first reading the data at the range of memory addresses (i.e., a write-before-read instruction), the processor core 240 outputs this memory address range to the zero fill range block 280. As another example, if the processor core 240 needs a zero buffer for a particular range of memory addresses, the processor core 240 can output a zero fill range corresponding to the range of addresses, and execute a read instruction for the range of addresses, to receive the zero buffer.

The processor 210 interfaces with remote memory 1 260 and remote memory 2 260 via the cache assist controller 290 and the system crossbar 250. The remote memories 260 and 270 may include lower-level caches (e.g., L2 and L3 caches), main memory (e.g., DRAM or another type of RAM), or other types of memories. Fewer or more remote memories than shown in FIG. 2 may be included. Each of the remote memories may be on the same chip or die as the processor 210, or on one or more separate chips or dies. The cache assist controller 290 and the system crossbar 250 sit between the processor 210 and the remote memories 260 and 270. The cache assist controller 290 interfaces with the system crossbar 250 to access the remote memories 260 and 270.

More particularly, the cache assist controller 290 receives requests for data at particular memory addresses from the L1 cache controller 230. For a particular data request received from the L1 cache controller 230, the cache assist controller 290 may return zero fill, return data stored locally by the cache assist controller 290, or fetch the data from a lower level memory, i.e., remote memory 1 260 or remote memory 2 270. The cache assist controller 290 accesses the zero fill range block 280 provided by the processor core 240 and determines whether to return zero fill to the L1 cache controller 230 based on the zero fill range.

In an example, the processor core 240 issues a read command to conduct a read operation for reading data from memory, or issues a write command to conduct a write operation for writing data to memory. A read command or write command is referred to generally as a "read/write command." If the processor core 240 does not require the existing data stored in the memory address or addresses referenced by the read/write command, the processor core 240 outputs an address range corresponding to the read/write command in the zero fill range block 280. For example, the processor core 240 outputs the zero fill range for a write-before-read instruction, or if the processor core 240 is seeking a zero buffer. The L1 cache controller 230 receives the read/write command issued by the processor core 240 and checks whether the L1 cache 220 stores a copy of the data stored at the referenced memory address. If the L1 cache controller 230 does not have the data, the L1 cache controller 230 transmits a cache request with a requested memory address to the cache assist controller 290. The cache assist controller 290 compares the memory address in the cache request to the zero fill range and, if the memory address falls within the zero fill range, the cache assist controller 290 returns a string of zeroes to the L1 cache controller 230.

As described with respect to FIG. 1, in addition to returning data responsive to a read/write request, the L1 cache controller 230 pre-fetches additional data based on the read/write command from the processor core 240. For example, if the processor core 240 issues a read/write command referencing an address A in remote memory 2 270, the L1 cache controller 230 pre-fetches data for a subsequent range of addresses, e.g., address A+1 through address A+3. In different embodiments, the pre-fetch range may be smaller (one line or two lines) or larger (four or more lines). In the implementation shown in FIG. 2, the L1 cache controller 230 transmits a cache request for the pre-fetch data to the cache assist controller 290. The cache assist controller 290 compares the address or addresses in the pre-fetch cache request to the zero fill range block 280 and returns zero fill if the pre-fetch data address or addresses fall within the zero fill range. The processor core 240 may be configured to output an address range that includes the pre-fetch range to the zero fill range block 280.

The cache assist controller 290 may be an extended cache controller that is configured to pre-fetch and store extended cache data beyond the pre-fetched data stored in the L1 cache 220. For example, if the L1 cache controller 230 pre-fetches address A+1 through A+3 and stores them in the L1 cache 220, the cache assist controller 290 may fetch the next four data lines, i.e., the data lines stored at addresses A+4 through A+7, and store this fetched data in a local buffer at the cache assist controller 290. The cache assist controller 290 observes the operations of the processor core 240 and determines the extended cache data to pre-fetch based on the operations. The extended cache data improves the speed of the cache assist controller 290 in responding to future data requests from the L1 cache controller 230.

The cache assist controller 290 may determine whether or not to pre-fetch the extended cache data and store it in its local buffer based on the zero fill range. In particular, the cache assist controller 290 identifies an address or range of addresses for the extended cache, compares the address or addresses for the extended cache to the range in the zero fill range block 280, and fetches the extended cache data if it does not fall within the zero fill range. If the extended cache range falls within the zero fill range, the cache assist controller 290 does not fetch the extended cache data. The processor core 240 may be configured to output an address range that includes the extended cache range to the zero fill range block 280.

Figure 3:
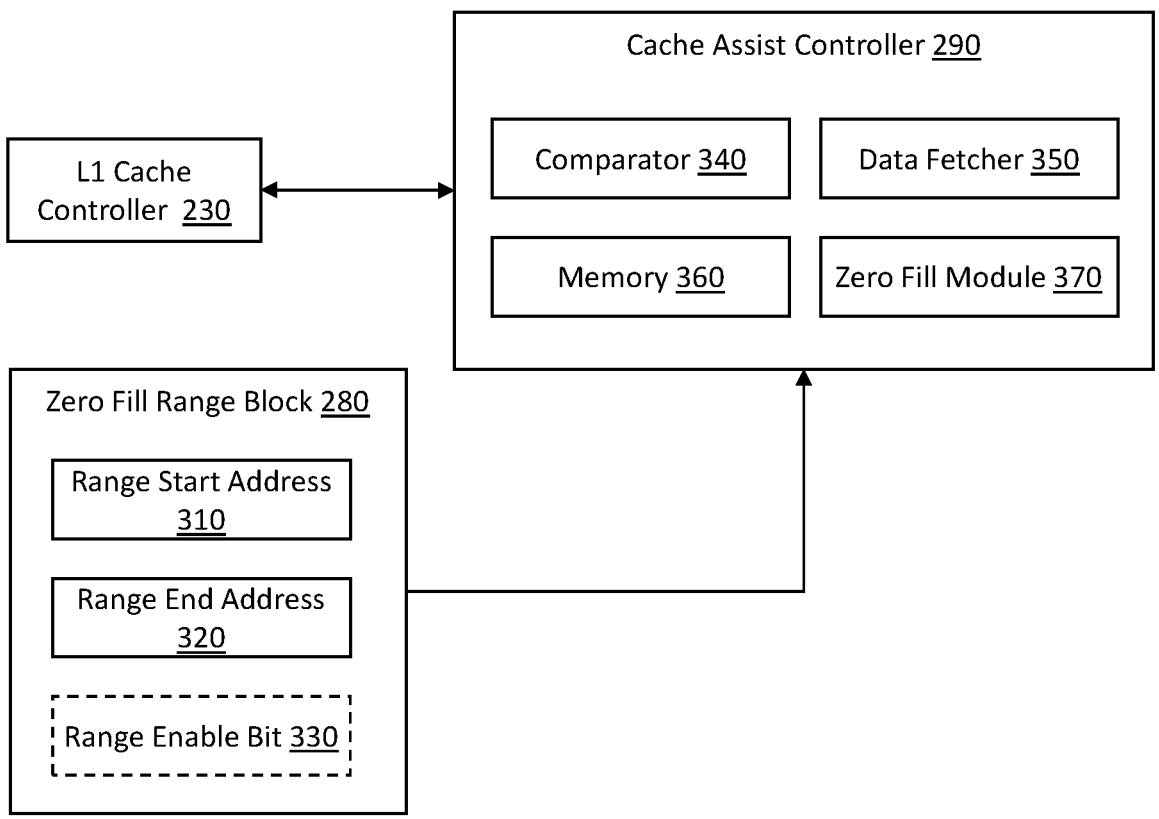
FIG. 3 is a block diagram illustrating the cache assist controller and the zero fill range, according to some embodiments of the present disclosure.

FIG. 3 is a block diagram of illustrating the cache assist controller 290 and the zero fill range block 280, according to some embodiments of the present disclosure. The zero fill range block 280 includes a range start address 310, a range end address 320, and, in some embodiments, a range enable bit 330. The zero fill range block 280 may be implemented as a register or set of registers that are written by the processor core 240 and accessible by the cache assist controller 290. The zero fill range block 280 may be stored on the processor 210, as shown in FIG. 2, or at a memory location off the processor 210. In some embodiments, the processor core 240 transmits the zero fill range block 280 to the cache assist controller 290, which stores the zero fill range block 280 in a local memory.

The range start address 310 is a beginning of a range of addresses for which the processor core 240 instructs the cache assist controller 290 to return zero fill rather than fetch the data within the range of addresses. The range end address 320 is an end of the range of addresses for the processor core 240 instructs the cache assist controller 290 to return zero fill. The range start address 310 and range end address 320 are addresses in a memory of the processing system, e.g., one of remote memories 260 or 270. For example, remote memory 1 260 is a level 2 (L2) cache, and remote memory 270 is a DRAM. In this example, the range start address 310 and range end address 320 reference an address range of the DRAM.

The range start address 310 may be a start address for a read/write command issued by the processor core 240. In one embodiment, the range end address 320 is an end address for the read/write command issued by the processor core 240. For example, if the processor core 240 is writing to a range of memory address A through A+5, the range start address 310 is A, and the range end address 320 is A+5. In some cases, the range start address 310 and range end address 320 may be the same address, e.g., if the processor core 240 is reading or writing to a single address line A.

In another embodiment, the range end address 320 corresponds to the length of the cache buffer that the cache controller 230 and cache assist controller 290 retrieve based on a read/write command. For example, if the cache controller 230 retrieves an L1 pre-fetch buffer, and the cache assist controller 290 does not pre-fetch an extended cache, the range end address 320 may correspond to the end of the L1 pre-fetch buffer. As another example, if the cache assist controller 290 pre-fetches extended cache data, the range end address 320 may correspond to the end of the extended cache range. In the example described with respect to FIG. 2, in which the processor core 240 conducts a read/write operation on an address A, the L1 cache controller 230 pre-fetches data in the range A+1 through A+3, and the cache assist controller 290 pre-fetches data in the range A+4 through A+7, the range start address 310 is A, and the range end address 320 is A+7. If the processor core 240 then conducts a read/write operation on address A+1, the range end address may be updated to A+8, as the data for line A+4 would move into the L1 cache 220, and the cache assist controller 290 would retrieve the next data line, i.e., A+8.

In some embodiments, the processor core 240 outputs a range enable bit 330 that indicates whether or not the zero fill range is in effect. For example, when the processor core 240 is conducting operations for which zero fill may or should be provided (e.g., a write operation), the processor core 240 switches on the range enable bit 330, e.g., from zero to one (or vice versa), to indicate that the zero fill range is active. When the processor core 240 finishes conducting operations for which the zero fill may or should be provided, the processor core 240 switches off the range enable bit 330. In another embodiment, instead of using the range enable bit 330, the processor core 240 may reset the range start address 310 and range end address 320 in response to completing a read/write process that triggered the zero fill range. For example, the processor core 240 may set the range start address 310 and range end address 320 to all zeroes, all ones, or to another code that indicates to the cache assist controller 290 that the zero fill range is inactive.

The cache assist controller 290 includes a comparator 340, a data fetcher 350, a memory 360, and a zero fill module 370. The comparator 340 is configured to compare the zero fill range, i.e., the range start address 310 and range end address 320, to a particular address or range of addresses. In particular, the comparator 340 compares the zero fill range to an address or address range of a data request that the cache assist controller 290 receives from the L1 cache controller 230, which may be a request to fetch or pre-fetch data based on the activities of the processor core 240. The comparator 340 may also compare the zero fill range to an extended cache range to be retrieved by the cache assist controller 290, as described above. The comparator 340 may first check the range enable bit 330, and if the range enable bit 330 is switched on, then compare the range start address 310 and range end address 320 to pre-fetch address or range.

In some embodiments, the comparator 340 determines if a particular memory address (e.g., an address requested by the L1 cache controller, or an address for the extended cache) is on a cache line of the zero fill range. If the memory address is on the cache line of the zero fill range, even if it is outside the particular address range indicated in the zero fill range block 280, the comparator 340 determines to return zero fill for this address. Table 1 below shows an example of this policy for different zero fill ranges and two different requests from the L1 cache controller 230. In this example, the cache line includes four addresses. In particular, addresses A through A+3 form a first cache line, and addresses A+4 through A+7 form a second cache line.

TABLE 1

| Zero Fill Range Start Address 310 | Zero Fill Range End Address 320 | Behavior Responsive to Request for Address A | Behavior Responsive to Request for Memory Address A + 4 |
|---|---|---|---|
| A | A | Return Zero Fill | Fetch Data |
| A | A + 2 | Return Zero Fill | Fetch Data |
| A | A + 3 | Return Zero Fill | Fetch Data |
| A | A + 6 | Return Zero Fill | Return Zero Fill |
| A | A + 7 | Return Zero Fill | Return Zero Fill |
| A + 2 | A + 5 | Return Zero Fill | Return Zero Fill |
| A + 2 | A + 7 | Return Zero Fill | Return Zero Fill |
| A + 4 | A + 5 | Fetch Data | Return Zero Fill |
| A + 4 | A + 7 | Fetch Data | Return Zero Fill |

Note that in Table 1, if the L1 cache controller 230 requests address A and the zero fill range begins at A+2, the cache assist controller 290 returns zero, because the requested address A is on the same cache line on which the zero fill range begins.

If the comparator 340 receives a range of addresses (e.g., a fetch or pre-fetch range) to compare to the zero fill range, the comparator 340 may compare each address in the fetch or pre-fetch range, line by line, to the zero fill range. Alternatively, the comparator 340 may determine whether the full range (e.g., the full fetch range or pre-fetch range) range falls within the zero fill range, or whether the full range falls within a cache line or set of cache lines that are within or coextensive with the cache lines indicated by the zero fill range.

The data fetcher 350 fetches data from lower level memories. In particular, the data fetcher 350 fetches data for addresses that do not fall within an active zero fill range, as determined by the comparator 340. The data fetcher 350 may return the fetched data to the L1 cache controller 230, if the data was requested by the L1 cache controller 230. Alternatively, the data fetcher 350 may store the fetched data in a local memory 360, if the data is extended cache data pre-fetched by the cache assist controller 290. The data fetcher 350 may determine the address range for the extended cache stored on the cache assist controller 290, submit this address range to the comparator 340, and fetch the extended cache data based on a signal received from the comparator 340. The local memory 360 for storing the extended cache data may be implemented as a buffer or series of buffers.

The zero fill module 370 returns zero fill to the L1 cache controller 230 in response to a data request from the L1 cache controller 230 that the comparator 340 determines can be satisfied by zero fill, rather than by the data stored in a lower-level memory. The zero fill module 370 generates a string of zeroes that matches the length of the data span requested by the L1 cache controller 230. For example, if the L1 cache controller 230 requests data for particular line at address A, and the data lines in the processing system are 256 bits, the zero fill module 370 returns a string of 256 zeroes to the L1 cache controller 230. In other implementations, the cache assist controller 290 is configured to supply one fill (i.e., a string of 1s) rather than zero fill, and the zero fill module 370 is replaced by a one fill module. In other implementations, the cache assist controller 290 can provide other types of dummy data, e.g., alternating strings of ones and zeroes or another pattern.

Example Process Performed by Processor Core Configured for Zero Fill

Figure 4:
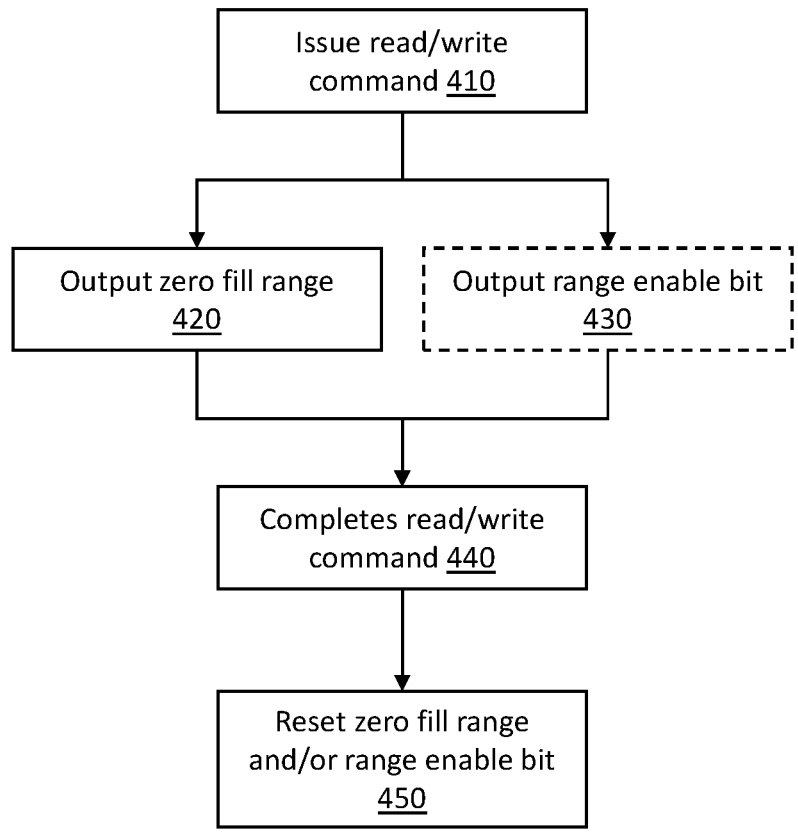
FIG. 4 is a flow diagram showing a process performed by the processor core to generate the zero fill range, according to some embodiments of the present disclosure.

FIG. 4 is a flow diagram showing a process performed by the processor core 240 to generate the zero fill range. The processor core 240 issues 410 a read/write command. For example, the processor core 240 conducts a write operation of writing data to a particular address A. The processor core 240 outputs 420 a zero fill range block 280 that indicates to the cache assist controller 290 that zero fill can be returned for the address A. In some embodiments, the zero fill range includes one or more additional addresses (e.g., A+1 through A+7) that the processor core 240 anticipates the cache assist controller 290 would retrieve based on the read/write command, and that the cache assist controller 290 can provide zero fill for. If the range enable bit 330 is used, the processor core 240 also outputs 430 the range enable bit, e.g., by switching the range enable bit 330 from 0 to 1.

At a later time, the processor core 240 completes 440 the read/write command or set of commands for which the zero fill range is enabled. For example, the processor core 240 finishes performing a set of write operations and begins conducting a set of read operations. The processor core 240 then resets 450 the zero fill range block 280 (the range start address 310 and range end address 320), or, if the range enable bit 330 is used, resets the range enable bit 330, e.g., by switching the range enable bit 330 from 1 to 0. In some embodiments, the processor core 240 resets the range start address 310, the range end address 320, and the range enable bit 330.

Example Process for Retrieving Extended Cache Data

Figure 5:
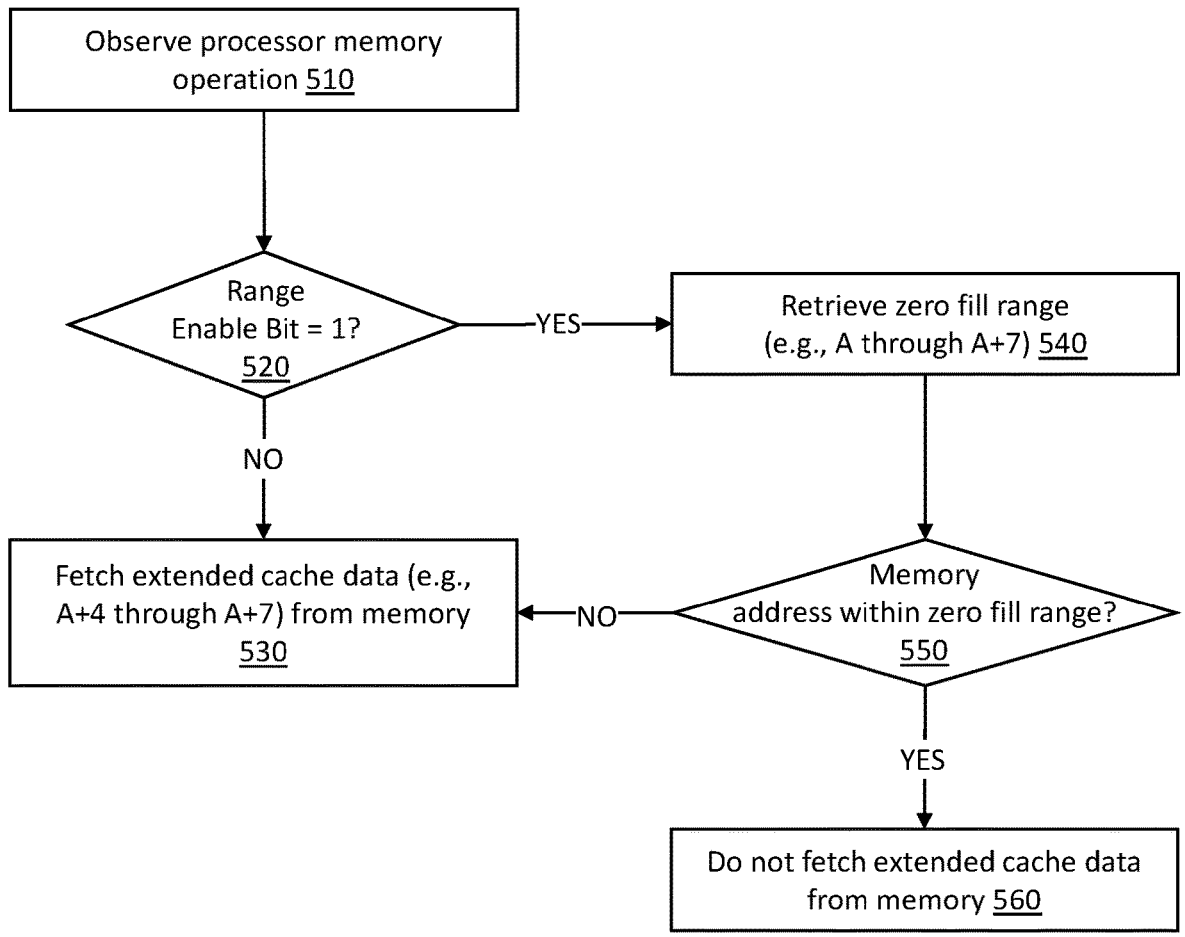
FIG. 5 is a flow diagram showing a data fetching process performed by the cache assist controller, according to some embodiments of the present disclosure.

FIG. 5 is a flow diagram showing a data fetching process performed by the cache assist controller, according to some embodiments of the present disclosure. The process shown in FIG. 5 is performed by a cache assist controller that pre-fetches extended cache data. The cache assist controller, e.g., cache assist controller 290, observes 510 a memory operation of the processor 210, e.g., a read or write operation. The cache assist controller 290 (e.g., the comparator 340) determines 520 whether the range enable bit is enabled, e.g., if the range enable bit 330 is equal to zero. If the range enable bit is not enabled, the cache assist controller 290 (e.g., the data fetcher 350) fetches 530 extended cache data (e.g., the data at address lines A+4 through A+7, in the example discussed above) from a lower level memory and stores the extended cache data in the local memory 360.

If the range enable bit is enabled (e.g., the range enable bit 330 equals one), the cache assist controller 290 retrieves 540 the zero fill range (e.g., the range start address 310 and range end address 320) output by the processor core 240. In the example described above in which the processor core 240 is writing to memory address A, the zero fill range may be A through A+7. The cache assist controller 290 (e.g., the comparator 340) compares 550 the zero fill range to the extended cache addresses that the cache assist controller 290 would fetch based on the observed processor operation. If the extended cache addresses are within the zero fill range, the cache assist controller 290 does not fetch 560 the extended cache data from a lower level memory. If the extended cache addresses are not within the zero fill range, the cache assist controller 290 fetches 530 the extended cache data from a lower level memory.

As described with respect to FIG. 3, in alternate embodiments, the processor core 240 does not output a range enable bit, and the extended cache controller does not perform decision 520, but instead determines whether or not to fetch the extended cache data based on the range start address and range end address.

Example Process for Assisting L1 Cache Controller

Figure 6:
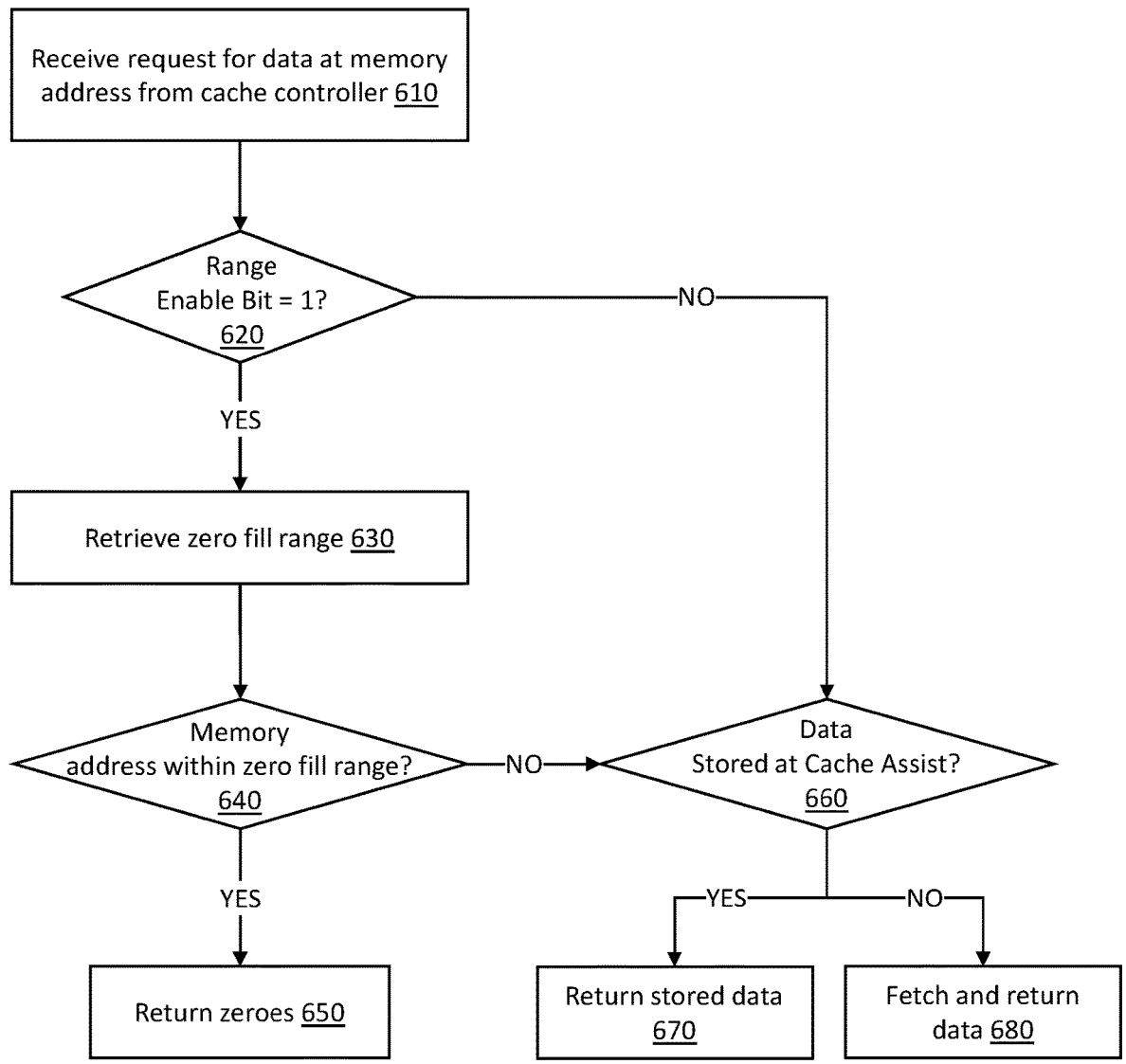
FIG. 6 is a flow diagram showing a cache assist process performed by the cache assist controller, according to some embodiments of the present disclosure.

FIG. 6 is a flow diagram showing a cache assist process performed by the cache assist controller, according to some embodiments of the present disclosure. The process shown in FIG. 6 is performed by a cache assist controller that assists an L1 cache controller, e.g., the L1 cache controller 230.

The cache assist controller 290 receives 610 a request for data stored at a particular memory address of a lower level memory from a cache controller, e.g., L1 cache controller 230. For example, the cache assist controller 290 receives a request for addresses A+1 through A+3 from the L1 cache controller 230. The cache assist controller 290 (e.g., the comparator 340) determines 620 whether the range enable bit is enabled, e.g., if the range enable bit 330 is equal to zero. If the range enable bit is not enabled, the cache assist controller 290 proceeds to step 660, described below. If the range enable bit is enabled, the cache assist controller 290 retrieves 630 the zero fill range (e.g., the range start address 310 and range end address 320) output by the processor core 240. The cache assist controller 290 (e.g., the comparator 340) compares 640 the zero fill range to the memory address requested by the cache controller. If the memory address is within the zero fill range, the cache assist controller 290 (e.g., the zero fill module 370) returns 650 a string of zeroes corresponding to the amount of data stored at the memory address, without retrieving or providing the data at the memory address.

If the memory address is not within the zero fill range, or if the range enable bit is not enabled, the cache assist controller 290 determines 660 if a copy of the data is stored at the cache assist controller 290, e.g., in the local memory 360. If the data copy is stored at the cache assist controller 290, the cache assist controller 290 returns 670 the stored data to the cache controller. If the data copy is not stored at the cache assist controller 290, the cache assist controller 290 (e.g., the data fetcher 350) fetches 680 the data from a lower level memory and returns the fetched data to the cache controller.

Example Processing System with Cache Assist Controller at Remote Memory

In the example shown in FIG. 2, the cache assist controller 290 is positioned near the processor 210 and is configured to assist the L1 cache 220 and L1 cache controller 230. In other embodiments, a cache assist controller can be included at other portions of the processing system and configured to assist other caches, such as L2 or L3 caches.

Figure 7:
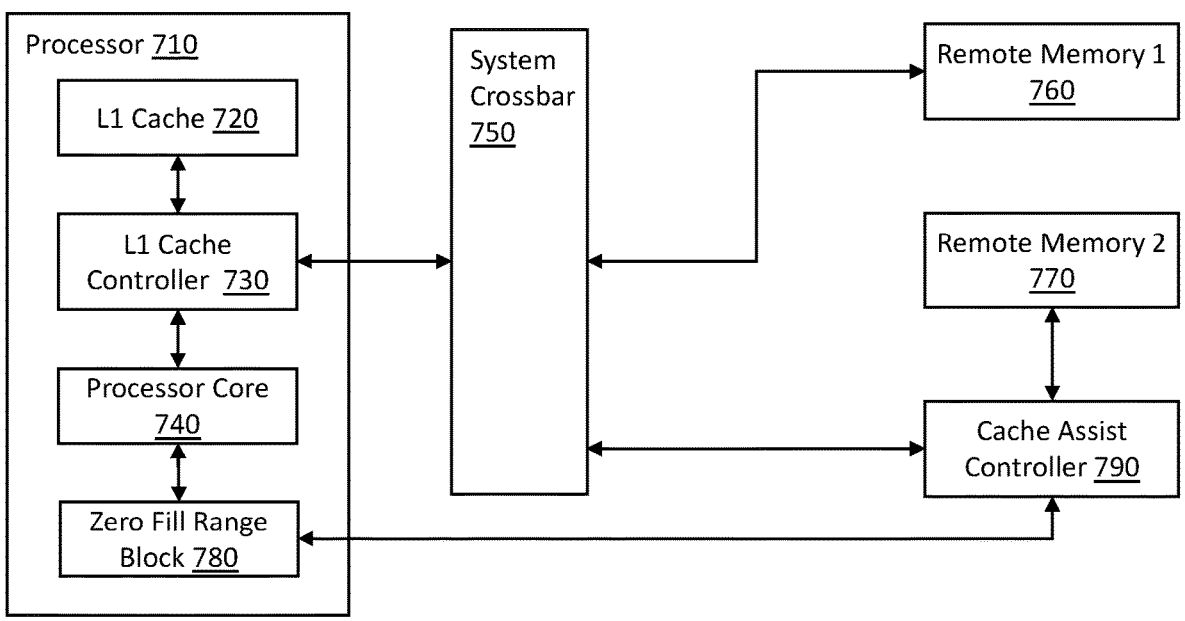
FIG. 7 is a block diagram of a second processing system that includes a cache assist controller near a remote memory, according to some embodiments of the present disclosure.

FIG. 7 is a block diagram of a second processing system that includes a cache assist controller near a remote memory. The processing system includes a processor 710, a system crossbar 750, two remote memories 760 and 770, and a cache assist controller 790. The processor 710, system crossbar 750, and remote memories are similar to the processor 210, system crossbar 250, and remote memories 760 and 770 described above. Here, the cache assist controller 790 is positioned next to the remote memory 2 770, e.g., an L2 cache. The cache assist controller 790 receives cache requests from the remote memory 2 770 and fulfills the requests from a local extended cache or a lower level memory, such as a DRAM. The cache assist controller 790 receives a zero fill range output by the processor core 740. The zero fill range block 780 may the same as the zero fill range block 280 accessed by the cache assist controller 290, or it may have a different range. For example, the processor core 740 may output a zero fill range block 780 with memory addresses that the processor core 740 expects the remote memory 770 to request but that can be satisfied with zero fill. The cache assist controller 790 operates in a similar fashion to the cache assist controller 290 described above, but the cache assist controller 790 responds to requests from the remote memory 2 770, rather than the L1 cache controller 730.

In some embodiments, a processing system may include multiple cache assist controllers for different caches. For example, a processing system may include a first cache assist controller (e.g., cache assist controller 290) for assisting an L1 cache, and a second cache assist controller (e.g., cache assist controller 790) for assisting an L2 cache. In such examples, the processor core may output a respective zero fill range for each cache assist controller, or a single zero fill range that is accessed by multiple cache assist controllers.

Select Examples

Example 1 provides a processor system that includes a processor core and a cache assist controller. The processor core is configured to issue a read/write command for reading data from or writing data to a memory, and, in response to issuing the read/write command, output an address range corresponding to the read/write command. The cache assist controller is configured to receive the address range output by the processor core; receive a cache request from a cache controller, the cache request including a memory address; compare the memory address to the address range; and, in response to the memory address falling within the address range, returning a string of zeroes to the cache controller in response to the cache request.

Example 2 provides the processor system according to example 1, where the address range corresponding to the read/write command includes a start address for the read/write command.

Example 3 provides the processor system according to example 2, where the address range corresponding to the read/write command further includes an end address for the read/write command.

Example 4 provides the processor system according to example 2, where the address range corresponds to a length of a cache buffer used by the cache assist controller, an end address of the address range determined based on the start address for the read/write command and the size of the cache buffer.

Example 5 provides the processor system according to any of the preceding examples, where the processor core is further configured to output a range enable bit, and the cache assist controller is further configured to determine, based on the range enable bit, to compare the memory address to the address range.

Example 6 provides the processor system according to any of the preceding examples, where the processor core is further configured to reset a register storing the address range in response to completing a read/write process.

Example 7 provide the processor system according to any of the preceding examples, where the cache assist controller is further configured to fetch data stored at the memory address in response to the memory address falling outside the address range.

Example 8 provides the processor system according to any of the preceding examples, where the cache assist controller is further configured to detect a second read/write command issued by the processor core, the second read/write command including a second memory address; identify a second address range based on the second memory address; and fetch data stored in the memory at the second address range Example 9 provides the processor system according to example 8, where the cache assist controller does not fetch data from the memory in response to the second memory address falling within the address range.

Example 10 provides a cache assist controller that includes a first input configured to receive an address range, the address range provided by a processor core issuing a read/write command; a second input configured to receive, from a cache controller, a request for data stored at a memory address; and processing circuitry configured to compare the memory address to the address range, return a string of zeroes to the cache controller in response to the memory address falling within the address range, and return data stored at the memory address in response to the memory address falling outside the address range.

Example 11 provides the cache assist controller according to example 10, where the processing circuitry is further configured to determine that the data stored at the memory address is not stored in a local memory of the cache assist controller, and fetch the data stored at the memory address from a memory.

Example 12 provides the cache assist controller according example 10 or 11, where the address range is a range for the read/write command issued by the processor core, the address range including a start address for the read/write command and an end address for the read/write command.

Example 13 provides the cache assist controller according to example 10 or 11, where the address range is a cache range that includes a start address for the read/write command issued by the processor core and an end address determined based on the start address for the read/write command and the size of the cache buffer.

Example 14 provides the cache assist controller for any of examples 10 through 13, where the cache assist controller is further configured to receive a range enable bit, and the processing circuitry is further configured to determine, based on the range enable bit, to compare the memory address to the address range.

Example 15 provides the cache assist controller for any of examples 10 through 14, where the cache assist controller is further configured to detect a second read/write command issued by the processor core, the read/write command including a second memory address; identify a second address range based on the second memory address; and fetch data stored in the memory at the second address range.

Example 16 provides the cache assist controller of example 15, where the cache assist controller does not fetch data from the memory in response to the second memory address falling within the address range.

Example 17 provides a method that includes receiving, from a processor core conducting a read/write operation, an address range; receiving, from a cache controller, a request for data stored at a memory address of the memory; comparing the memory address to the address range; in response to the memory address falling within the address range, returning a string of zeroes to the cache controller; and in response to the memory address falling outside the address range, returning data stored at the memory address.

Example 18 provides the method according to example 17, where returning the data stored at the memory address includes determining that the data stored at the memory address is not available in a local memory different from the memory, and fetching the data stored at the memory address from the memory.

Example 19 provides the method according to example 17 or 18, where the address range is a range for the read/write operation, the address range including a start address for the read/write operation and an end address for the read/write operation.

Example 20 provides the method according to any of examples 17 through 19, further including receiving a range enable bit and determining, based on the range enable bit, to compare the memory address to the address range.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A processor system comprising:
   a processor core configured to:
      issue a read/write command for reading data from or writing data to a memory; and
      in response to issuing the read/write command, output an address range corresponding to the read/write command; and
   a cache assist controller configured to:
      receive the address range output by the processor core;
      receive a cache request from a cache controller, the cache request comprising a memory address;
      compare the memory address to the address range; and
      in response to the memory address falling within the address range, returning a string of zeroes to the cache controller in response to the cache request.

2. The processor system of claim 1, wherein the address range corresponding to the read/write command comprises a start address for the read/write command.

3. The processor system of claim 2, wherein the address range corresponding to the read/write command further comprises an end address for the read/write command.

4. The processor system of claim 2, wherein the address range corresponds to a length of a cache buffer used by the cache assist controller, an end address of the address range determined based on the start address for the read/write command and the length of the cache buffer.

5. The processor system of claim 1, wherein the processor core is further configured to output a range enable bit, and the cache assist controller is further configured to determine, based on the range enable bit, to compare the memory address to the address range.

6. The processor system of claim 1, wherein the processor core is further configured to reset a register storing the address range in response to completing a read/write process.

7. The processor system of claim 1, wherein the cache assist controller is further configured to fetch data stored at the memory address in response to the memory address falling outside the address range.

8. The processor system of claim 1, wherein the cache assist controller is further configured to:
   detect a second read/write command issued by the processor core, the second read/write command comprising a second memory address;
   identify a second address range based on the second memory address; and
   fetch data stored in the memory at the second address range.

9. The processor system of claim 8, wherein the cache assist controller does not fetch data from the memory in response to the second memory address falling within the address range.

10. A cache assist controller comprising:
    a first input configured to receive an address range, the address range provided by a processor core issuing a read/write command;
    a second input configured to receive, from a cache controller, a request for data stored at a memory address; and
    processing circuitry configured to:
       compare the memory address to the address range,
       in response to the memory address falling within the address range, return a string of zeroes to the cache controller, and
       in response to the memory address falling outside the address range, return data stored at the memory address.

11. The cache assist controller of claim 10, wherein the processing circuitry is further configured to:
    determine that the data stored at the memory address is not stored in a local memory of the cache assist controller; and
    fetch the data stored at the memory address from a memory.

12. The cache assist controller of claim 10, wherein the address range is a range for the read/write command issued by the processor core, the address range comprising a start address for the read/write command and an end address for the read/write command.

13. The cache assist controller of claim 10, wherein the address range is a cache range comprising a start address for the read/write command issued by the processor core and an end address determined based on the start address for the read/write command and a length of a cache buffer.

14. The cache assist controller of claim 10, wherein the cache assist controller is further configured to receive a range enable bit, and the processing circuitry is further configured to determine, based on the range enable bit, to compare the memory address to the address range.

15. The cache assist controller of claim 10, wherein the cache assist controller is further configured to:
   detect a second read/write command issued by the processor core, the read/write command comprising a second memory address;
   identify a second address range based on the second memory address; and
   fetch data stored in a memory at the second address range.

16. The cache assist controller of claim 15, wherein the cache assist controller does not fetch data from the memory in response to the second memory address falling within the address range.

17. A method comprising:
   receiving, from a processor core conducting a read/write operation, an address range;
   receiving, from a cache controller, a request for data stored at a memory address of a memory;
   comparing the memory address to the address range;
   in response to the memory address falling within the address range, returning a string of zeroes to the cache controller; and
   in response to the memory address falling outside the address range, returning data stored at the memory address.

18. The method of claim 17, wherein returning the data stored at the memory address comprises:
   determining that the data stored at the memory address is not available in a local memory different from the memory; and
   fetching the data stored at the memory address from the memory.

19. The method of claim 17, wherein the address range is a range for the read/write operation, the address range comprising a start address for the read/write operation and an end address for the read/write operation.

20. The method of claim 17, further comprising:
   receiving a range enable bit; and
   determining, based on the range enable bit, to compare the memory address to the address range.

* * * * *